United States Patent [19]

Webb

[11] Patent Number: 5,208,938
[45] Date of Patent: May 11, 1993

[54] CENTRIFUGALLY OPERATED WIPER MECHANISM FOR CLEANING TURRET MOUNTED LENSES

[75] Inventor: Duncan J. Webb, Essex, England

[73] Assignee: GEC-Marconi Limited, Stanmore, United Kingdom

[21] Appl. No.: 759,306

[22] Filed: Sep. 13, 1991

[30] Foreign Application Priority Data

Sep. 20, 1990 [GB] United Kingdom ................. 9020528

[51] Int. Cl.⁵ ............................. B60S 1/44; B60S 1/04
[52] U.S. Cl. ............................. 15/250.22; 15/250.001;
15/250.16; 15/250.01
[58] Field of Search ................. 15/250 A, 250.0012,
15/250.1, 250.15, 250.16, 250.22, 250.30,
250.19, 250.21, 250.23, 250.01; 358/113, 108

[56] References Cited

U.S. PATENT DOCUMENTS

| | | | |
|---|---|---|---|
| 2,100,055 | 11/1937 | Horton | 15/250.22 |
| 2,246,740 | 6/1941 | Lethbridge | 15/250.22 |
| 2,288,429 | 6/1942 | Baughn | 15/250.22 |
| 2,540,407 | 2/1951 | Reed-Lethbridge | 15/250.22 |
| 3,939,524 | 2/1976 | Knights | 15/250.36 |

FOREIGN PATENT DOCUMENTS

| | | | |
|---|---|---|---|
| 717519 | 2/1942 | Fed. Rep. of Germany | 15/250.22 |
| 0565918 | 2/1924 | France | 15/250.22 |
| 0201741 | 12/1982 | Japan | 15/250.30 |
| 0514282 | 11/1939 | United Kingdom | 15/250.22 |
| 2098467A | 4/1982 | United Kingdom . | |

Primary Examiner—Harvey C. Hornsby
Assistant Examiner—Gary K. Graham
Attorney, Agent, or Firm—Lowe, Price, LeBlanc & Becker

[57] ABSTRACT

A wiper mechanism (7), especially suitable for cleaning the curved lens (6) of a multirole turret, comprises a wiper (8) which is acted on centrifugally when the mechanism (7) is operated to cause the wiper (8) to be moved from a "parked" position (dashed outline) to an "operating" position (full outline) in which it wipes-clean the surface of the lens (6).

6 Claims, 3 Drawing Sheets

CENTRIFUGALLY OPERATED WIPER MECHANISM FOR CLEANING TURRET MOUNTED LENSES

BACKGROUND OF THE INVENTION

This invention relates to wiper mechanisms. It is especially applicable to wiper mechanisms for use with curved surfaces.

In electro-optical surveillance operations, it is known to make use of a turret which is mounted, for example, on a helicopter or fixed-wing aircraft, and which is provided with a thermal imaging system which includes an optical lens which is rotatable in azimuth and elevation in order that it can be pointed at an object under surveillance. Up to the present time it has not been usual to provide any means for wiping the surface of the lens whereby it may be cleaned. Providing a wiping mechanism for wiping-clean the lens is made difficult due to the fact that the curvature of the lens is normally different from that of the generally spherical housing in which it is contained and also by the fact that the lens is usually radially movable in the spherical housing for focussing purposes.

SUMMARY OF THE INVENTION

It is an object of the present invention to provide a wiper mechanism which is especially suitable for use in the above described equipment.

According to one aspect of the present invention there is provided a wiper mechanism comprising a wiper and centrifugally operated means for moving said wiper from a normally parked position to an operating position in which it used to wipe-clean a surface.

In carrying out the invention it may be arranged that the wiper is pivotally mounted on a plate which is rotated in order to effect movement of said wiper into said operating position, and it may be arranged that rotation of said plate also effects rotation of said wiper.

It may be arranged that said wiper is mounted on a spring loaded lever which is pivotally mounted on said plate, a centrifugally operated weight being mounted on said lever for moving said wiper into said operating position when said plate is rotated, against the spring loading of said lever.

Advantageously, said wiper, under the action of said centrifugally operated weight, is moved transversely to a position in which it is radially disposed relative to the axis of rotation of said plate.

It may be arranged that the wiper takes the form of a wiper blade or a wiper brush, and the wiper may be curved whereby it is adapted to wipe-clean a curved surface or it may be flat whereby it is adapted to wipe-clean a flat surface.

According to another aspect of the present invention there is provided an electro-optical surveillance device including a wiper mechanism as aforesaid.

In carrying out the invention according to the said another aspect, it may be arranged that said device comprises a rotatably mounted base member, and a generally spherical body member rotatably mounted on said base member, said base member including a wiper mechanism as aforesaid for cleaning a curved surface of said body member.

Advantageously, said curved surface of said body member will be constituted by an optical lens, it being arranged that said body member is rotatable whereby said lens may be positioned adjacent the wiper mechanism of said base member when said lens is to be cleaned.

BRIEF DESCRIPTION OF THE DRAWINGS

An exemplary embodiment of the invention will now be described reference being made to the accompanying drawings, in which.

DETAILED DESCRIPTION OF THE PREFERRED EMBODIMENT

Figure 1:
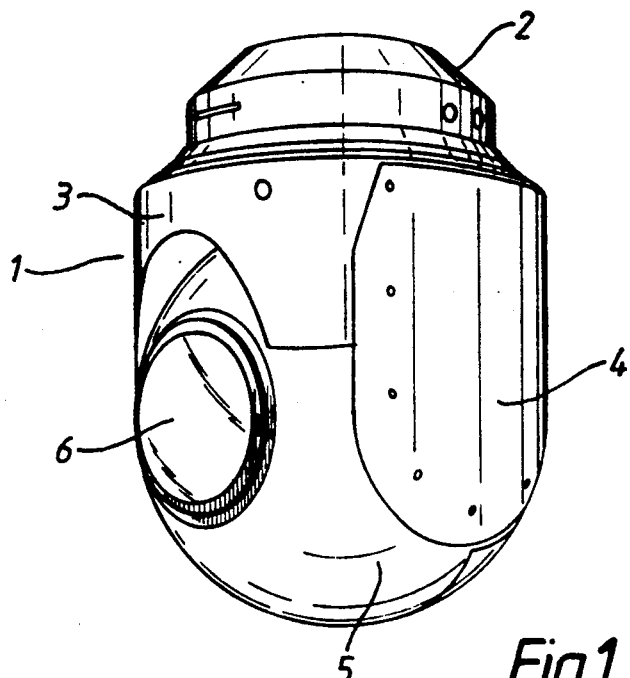
FIG. 1 is a perspective view of an electro-optical surveillance device in the form of a multirole turret in which the wiper mechanism of the present invention has particular application.

In FIG. 1 of the drawings there is depicted so-called multirole turret 1 which is usually mounted on the underside of a helicopter or fixed-wing aircraft. The turret 1 comprises a support member 2, which is secured to the helicopter or fixed-wing aircraft, on which is mounted a rotatable member 3. The rotatable member 3 is provided on diametrically opposite sides thereof with a pair of downwardly depending arms 4, only one of which is shown in FIG. 1, and between the arms 4 is rotatably mounted a generally spherical main body member 5. The main body member 5 is provided with an optical lens 6 which, due to the mounting of the main body member 5, is rotatable in azimuth and elevation whereby it may be pointed at an object under surveillance.

In use of the multirole turret described with reference to FIG. 1, the surface of the lens 6 will, especially in adverse weather conditions, become contaminated with dirt, rain etc. which may adversely affect the operation of the turret and it is desirable to provide some means of cleaning the surface of the lens 6.

Up to the present time it has not been usual to provide means for wiping-clean the surface of the lens 6. Providing a wiper mechanism for the lens 6 is made difficult due to the fact that the curvature of the surface of the lens 6 is different to the curvature of the generally spherical main body member 5, so that a wiper mechanism which operates on the surface of the main body member 5 will only clean part of the surface of the lens 6, and also the lens 6 is normally radially movable in the main body member 5 for focussing purposes. It is therefore necessary to provide a wiper mechanism which overcomes these difficulties.

Figure 2:
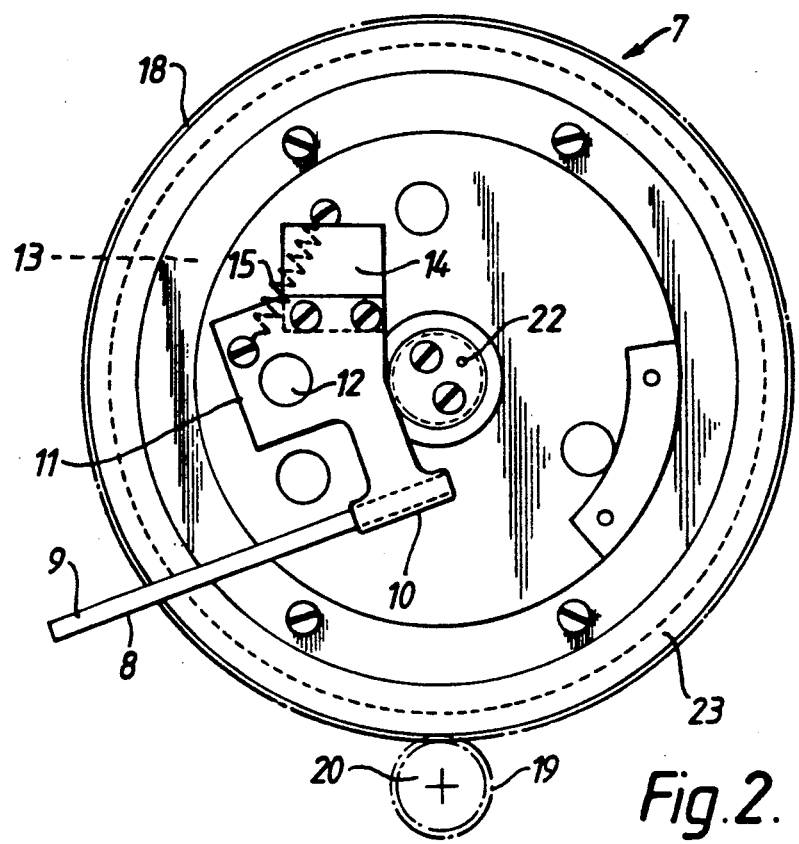
FIG. 2 and 3 are plan and cross-sectional side views respectively, of a wiper mechanism according to the present invention.
Figure 3:
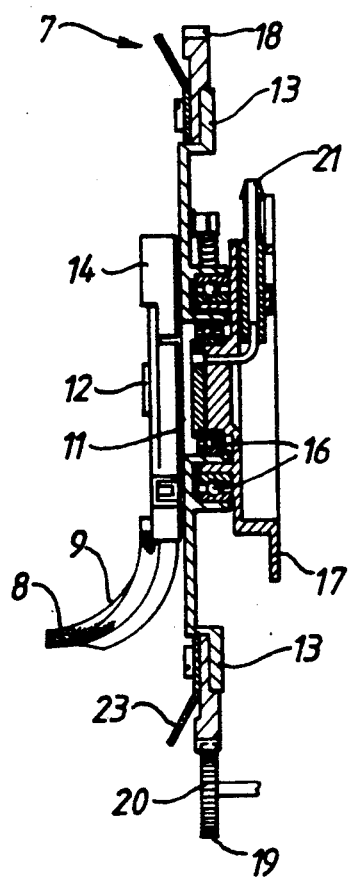

In FIGS. 2 and 3 of the drawings there is depicted a wiper mechanism 7 for the lens 6, the wiper mechanism 7 being mounted on the rotatable member 3 of the multirole turret of FIG. 1, between the arms 4 thereof, and pointing in a downwards direction so that the lens 6, under the control of the turret control system, can be moved to a position in which it lies adjacent to the wiper mechanism 7, i.e. where it points vertically upwards into the rotatable member 3, the wiper mechanism then being operated to bring a wiper into contact with the surface of the lens in order to clean it. The wiper mechanism 7 preferably also includes means for directing a jet of water or cleaning fluid onto the surface of the lens 6.

The wiper mechanism 7 shown in FIGS. 2 and 3 comprises a wiper brush 8 the outer surface 9 of which is shaped to correspond to the curvature of the lens 6 of the turret 1 of FIG. 1.

Figure 4:
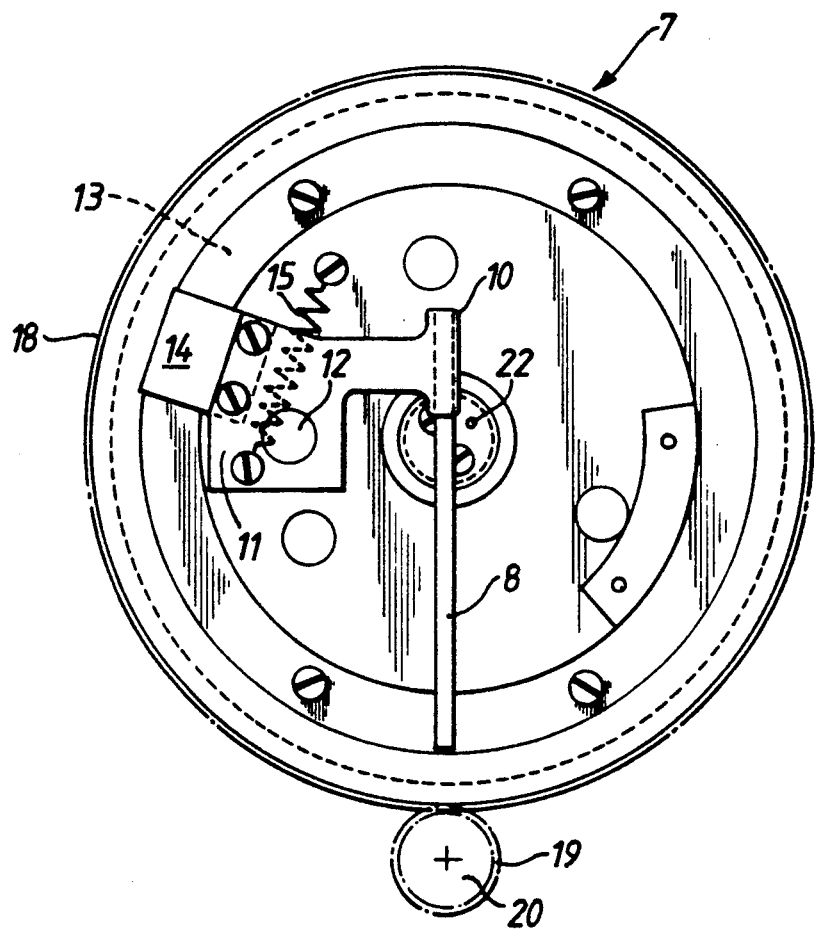
FIG. 4 is a plan view corresponding to that of FIG. 2 with the wiper brush in the operating position.

It is arranged that the wiper brush 8 is normally held in a "parked" position as shown in FIGS. 1 and 2 in which it is clear of the surface of both the lens 6 and the main body member 5 and is moved to an operating position as shown in FIG. 4 of the drawings, in which its outer surface 9 contacts the surface of the lens 6, when the wiper mechanism 7 is operated.

The wiper brush 8 is attached to one end 10 of a lever 11 which is pivotally mounted, by means of pivot 12, on a circular plate 13. The lever 11 is also provided with a weight 14 on the opposite side of the pivot 12 to the brush 8, and is biased, by means of spring 15, connected between the lever 11 and the plate 13, whereby the brush 8 is retained in the "parked" position shown in FIGS. 1 and 2.

The circular plate 13 is centrally rotatably mounted, by means of annular bearings 16 (FIG. 3), to a fixed plate 17 which is secured, by means not shown, to the internal structure (not shown) of the rotatable member 3 of the turret 1 of FIG. 1 The circular plate 13 is also provided around its circumference with gear teeth 18 which intermesh with gear teeth 19 of a drive gear 20 which, when the wiper mechanism 7 is operated, is driven by an electric motor (not shown), typically a D.C. torque motor, which causes the drive gear 20 and thus the plate 13 to be rotated. Typically when the wiper mechanism 7 is operated, the plate 7 may be rotated at 1000 rpm.

As the circular plate is rotated, the weight 14 carried on the lever 11 is acted on centrifugally and causes the lever 14 to be rotated about the pivot 12 and against the action of the spring 15, thereby causing the wiper brush 8 to be moved tranversely from its "parked" position shown in FIG. 2 to its "operating" position shown in FIG. 4, in which it is radially disposed relative to the axis of rotation of the circular plate 13. When the wiper mechanism 7 ceases operation, rotation of the circular plate 13 stops and the centrifugal forces acting on weight 14 cease. The wiper brush 8 is therefore returned to its "parked" position shown in FIGS. 2 and 3 under the action of the spring 15.

Figure 5:
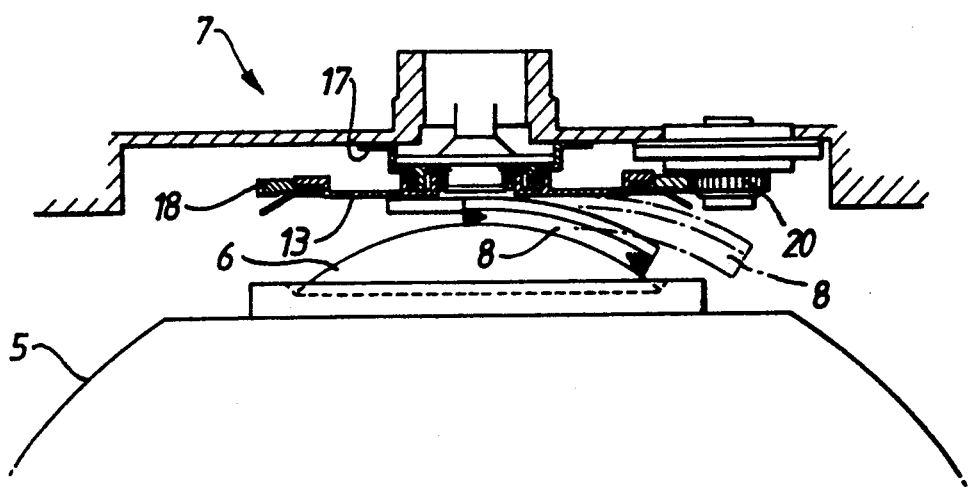
FIG. 5 is a diagrammatic side view of part of the multirole turret of FIG. 1, depicting the disposition of the wiper mechanism of FIGS. 2 and 3 relative to the optical lens thereof.

In FIG. 5 of the drawings there is shown, somewhat diagrammatically, a cross-sectional view depicting the disposition of the wiper mechanism 7 relative to the lens 6 mounted in the main body member 5.

In FIG. 5, the wiper brush 8 is shown in broken lines in its "parked" position, i.e. where it is clear of the surface of both the lens 6 and the main body member 5 and is shown in full lines in its "operating" position in which it contacts the surface of the lens 6, in which operating" position the wiper brush 8, due to the rotation of the circular plate 13 is caused to be rotated around the surface of the lens 6 to cause it to be cleaned.

In the wiper mechanism of FIGS. 2 and 3, a water supply pipe 21 (FIG. 3) is provided for supplying water or other cleaning fluid to an orifice 22 in the plate 13 so that a jet of water or fluid can be sprayed on the lens 6 when the wiper mechanism is operated. The circular plate 13 is also provided with a outwardly depending circumferential skirt 23 which acts as a splash guard for the gear teeth 18 and 19.

It should be appreciated that the embodiment of the invention which has been described has been given by way of example only and is applicable to the multirole turret application described. However, it is clear that the principle of the wiper mechanism which has been described has much wider application. For example, the wiper mechanism may be adapted to be used for wiping-clean flat as well curved surfaces and it is envisaged that the centrifugal action on the wiper brush may cause it to be moved in directions e.g. forwards and backwards, other than the transverse direction described. It is also clear that the wiper can take any convenient form and may comprise a brush, blade or other suitable cleaning surface.

I claim:

1. A wiper mechanism comprising a wiper, a plate which is rotatably mounted on an axis which is perpendicular to the surface of the plate, means for causing said plate to be rotated, a spring loaded lever on which said wiper is mounted, said spring loaded lever being pivotally mounted on said plate on an axis substantially parallel to the axis of rotation of said plate, said lever being biased into a predetermined parked position by said spring, and a centrifugally operated weight mounted on said lever, whereby when said plate is rotated said wiper is caused to be rotated and, under the action of said centrifugally operated weight is caused to be moved transversely relative to the axis of rotation of said plate form the parked position where it is clear of a surface to be cleaned, to an operating position, in which it is radially disposed relative to the axis of rotation of said plate, in which operating position said wiper contacts said surface.

2. A wiper mechanism as claimed in claim 1, comprising a base member on which said plate is rotatably mounted, said rotating means mounted on said base member for causing said plate to be rotated, a generally spherical body member rotatably mounted on said base member, said body member supporting the surface to b wiped and said surface being curved, whereby when said rotating means is operated said plate is caused to be rotated and said wiper is caused to be moved transversely from its parked position to its operating position in which it contacts the curved surface of said body member.

3. A wiper mechanism as claimed in claim 2, in which said curved surface of said body member is constituted by an optical lens, it being arranged that said body member is rotatable whereby said lens may be positioned adjacent to said wiper mechanism of said base member when said lens is to be cleaned.

4. A mechanism as claimed in claim 1 in which said wiper includes a wiper blade.

5. A mechanism as claimed in claim 1 in which said wiper includes a wiper brush.

6. A wiper mechanism as claimed in claim 1 in which said wiper is curved whereby it is adapted to wipe clean a curved surface.

* * * * *